United States Patent [19]

Wiebe et al.

[11] Patent Number: 5,724,870
[45] Date of Patent: Mar. 10, 1998

[54] STRIPPING PLIERS

[75] Inventors: Ulrich Wiebe, Dorentrup; Hartmut Schmode, Blomberg; Armin Herzog, Detmold; Joachim Kornfeld, Vlotho; Detlev Hetland, Detmold; Bernd David, Detmold; Gunther Hanning, Detmold; Thorsten Bornefeld, Schlangen; Gernot Siegmund, Detmold, all of Germany

[73] Assignee: Weidmüller Interface GmbH & Co., Detmold, Germany

[21] Appl. No.: 624,986

[22] Filed: Mar. 29, 1996

[30] Foreign Application Priority Data

Mar. 31, 1995 [DE] Germany ............... 195 12 132.5

[51] Int. Cl.[6] ................................................. H02G 1/12
[52] U.S. Cl. ................................. 81/9.43; 81/9.41
[58] Field of Search ................. 81/9.4, 9.41, 9.43

[56]   References Cited

U.S. PATENT DOCUMENTS

3,915,037  10/1975  Wiener .......................... 81/9.43
4,395,928  8/1983   Undin et al. ................... 81/9.43
5,572,911  11/1996  Schmode et al. ............... 81/9.43

Primary Examiner—James G. Smith
Attorney, Agent, or Firm—Birch, Stewart, Kolasch & Birch, LLP

[57]   ABSTRACT

Have a pliers housing (2), two clamping jaws (4, 28) which can be pivoted relative to each other to form a mouth (29) of the pliers, in which mouth two stripping members (51, 59) are arranged such that they can be displaced in the longitudinal direction of the mouth by a pull-rod (37), two handles (3, 12), which can be pivoted relative to each other, and a drive device, which is arranged in the pliers housing (2) and can be driven by the pivoting movement of the handles (3, 12) for pivoting the clamping jaws (4, 28) relative to each other and for longitudinal displacement of the pull-rod (37). The drive device has cam discs (18a, 18b) via which both the relative pivoting of the clamping jaws (4, 28) and the longitudinal displacement of the pull-rod (37) can be controlled.

20 Claims, 9 Drawing Sheets

FIG. 9

STRIPPING PLIERS

FIELD OF THE INVENTION

The invention relates to stripping pliers with a pliers housing, two pivotable clamping jaws, two handles and a drive device.

DESCRIPTION OF THE BACKGROUND ART

Stripping pliers of this type are already known from DE 44 20 050 C1, DE 24 02 187 B 2 and DE 90 06 400 U1. These stripping pliers have a pliers housing, two clamping jaws, which can be pivoted relative to each other to form a mouth of the pliers, in which mouth two stripping members are arranged such that they can be displaced in the longitudinal direction of the mouth by means of a pull-rod, two handles, which can be pivoted relative to each other, and a drive device. The drive device is arranged in the pliers housing and can be driven by the pivoting movement of the handles for pivoting the clamping jaws relative to each other and for longitudinal displacement of the pull-rod.

In the case of the conventional stripping pliers, the drive device is designed in the form of a toggle lever joint, a pair of articulated levers which is connected to a movable handle driven by means of a toggle lever, a clamping jaw which is connected in articulated fashion to the pliers housing and, furthermore, the pull-rod being acted on via the toggle lever. When the toggle lever joint breaks, the pull-rod is displaced relatively abruptly, which leads to severe shock loadings on the wrist of the user of the pliers, which must in addition be actuated with relatively great force.

U.S. Pat. No. 3,324,702 discloses a pliers-like crimping tool in which the drive of the movable pliers jaws is carried out by means of a cam disc.

SUMMARY OF THE INVENTION

The invention is based on the object of developing the above describe pliers in such a way that they offer greater user comfort.

Stripping pliers according to the invention are distinguished by the fact that the drive device contains at least one cam disc via which both the relative pivoting of the clamping jaws and the longitudinal displacement of the pull-rod can be controlled.

In particular, the pull-rod can be driven directly or indirectly by means of the cam disc, so that, depending on the profile of the guide surface of the cam disc, as a function of the pivoting position of the handles, a desired actuating force acts on the pull-rod. This force is selected in such a way that unpleasant impact effects when stripping a conductor with the aid of the stripping pliers are avoided. By means of appropriate design of the profile of the cam disc, self-clamping can in addition be achieved between the pivotable clamping jaw and the cam disc after the mouth of the pliers has been closed, so that then only the force for driving the pull-rod needs to be applied. This leads to a considerable reduction in the expenditure of force when operating the pliers.

The stripping pliers according to the invention can be designed in such a way that one of the handles and that clamping jaw which is located on the opposite side of the pliers housing are rigidly connected to the pliers housing, while the other of the handles and the other clamping jaw are pivotably mounted on the pliers housing.

Preferably, for the purposes of driving the pivotable clamping jaw, on a section thereof which projects beyond a pivot axis for the clamping jaw towards the rear end of the pliers, there is articulated a control element which cooperates with a guide surface of the at least one cam disc or is in contact therewith. By means of appropriate shaping of the guide surface, cooperating with the control element, of the cam disc, it is possible in this case to achieve the situation where, after carrying out a stripping operation, the mouth of the pliers opens once more with the handles still closed, in order to release a conductor which has now been stripped. In this case, the control element may be designed as a control cam, may carry at least one roller at its free end and may be able to be pivoted only over a limited angular range. In this arrangement, the control cam is pressed into its end pivoting position, pointing towards the rear end of the pliers, by spring force.

The at least one cam disc itself is driven via an articulated lever coupled to the pivotable handle, the cam disc acting with a further guide surface on, for example, a roller which is fitted on the pull-rod, in order to move the pull-rod and hence the stripping members towards the rear end of the pliers.

According to a further refinement of the invention, at least one cam disc is coupled in an articulated manner via a connecting element to a section of the pivotable clamping jaw which projects beyond a pivot axis for the clamping jaw towards the rear end of the pliers. The cam disc is able to be driven via an articulated lever which is coupled to the pivotable handle and whose free end is in contact with a guide surface of the cam disc.

In the case of this exemplary embodiment, the cam disc has an attachment which projects beyond its pivot towards the rear end of the pliers and, in the pivoting region of the pivotable handle, projects out of the handle which is fixed to the housing. After the handles have been closed to their furthest extent and a stripping operation has been carried out, this attachment is acted on by the pivotable handle, so that now, with the handles still closed, the cam disc is rotated in a direction which permits opening of the mouth of the pliers and hence removal from the mouth of the pliers of the end of the conductor which has now been stripped.

According to this exemplary embodiment, between the pivot of the cam disc and the connecting element, at least one actuating lever is articulated on the cam disc and extends in the direction of the articulated lever, which can be moved into the region between the cam disc and the actuating lever. The actuating lever acts with its edge facing away from the articulated lever on an attachment which is present on the pull-rod.

Here, too, by means of appropriate shaping of the guide surfaces or edges of the actuating lever, which are in contact on one side with the articulated lever and on the other side with the attachment located on the pull-rod, it is possible to preset a suitable profile of the force acting on the pull-rod in order to obtain lower impact effects in the pliers when stripping.

According to a still further exemplary embodiment of the pliers according to the invention, at least one cam disc is formed on a section of the pivotable clamping jaw which projects beyond a pivot axis of the clamping jaw towards the rear end of the pliers. The cam disc is also able to be driven via an articulated lever which is coupled to the pivotable handle and whose free end is in contact with a guide surface of the cam disc.

In the case of this exemplary embodiment, the at least one cam disc is integrated, for example, in one piece with the pivotable clamping jaw, which leads to a lower-cost production of the pliers. A separate cam disc is no longer necessary.

In this case at least one actuating lever, which extends towards the pivotable handle, may be articulated on the cam disc in such a way that the articulated lever can be moved into the region between the cam disc and the actuating lever, the actuating lever acting with its edge facing away from the articulated lever on an attachment which is present on the pull-rod. By means of appropriate shaping of the guide surface of the cam disc and of those edges lying opposite one another of the actuating lever, it is possible once more to ensure low-impact operation of the pliers when stripping.

According to a further very advantageous refinement of the invention, one of the clamping jaws, which is pivotable, is equipped with a bearing pin and is removably mounted via this bearing pin in a bearing device.

In other words, the pivotable clamping jaw can be removed from the pliers housing in a simple way, in order to obtain access to the interior of the pliers. The removal of the pivotable clamping jaw from the pliers housing can be carried out in particular in a simple way if the movable clamping jaw is driven via cam discs with whose guide surface it is in contact only via one contact element. In principle, however, removal of the pivotable clamping jaw is also possible if this is coupled to the cam disc in an articulated manner.

Advantageously, the bearing device may have two bearing plates in each case having two resilient limbs, between which ends of the bearing pin can be latched in a clamped manner. By this means, particularly rapid removal of the pivotable clamping jaw from the pliers housing is possible and, conversely, so is its rapid mounting on the pliers housing.

The bearing plates in this arrangement may be laid in depressions which are located on the inside on the side walls of the pliers housing, the free ends of the limbs pointing in the direction towards the mouth of the pliers. This results in the width of the stripping pliers not being increased as a result of the use of the bearing plates. In this arrangement, the bearing plates may have marginal cutouts in which attachments of the side walls engage with a snug fit, the attachments projecting into the depressions. By this means, the bearing plates can be fastened in a clamped manner in the depressions, so that no separate parts are required for mounting them, which simplifies the construction of the stripping pliers.

Further scope of applicability of the present invention will become apparent from the detail description given hereinafter. However, it should be understood that the detailed description and specific examples, while indicating preferred embodiments of the invention, are given by way of illustration only, since various changes and modifications within the spirit and scope of the invention will become apparent to those skilled in the art from this detail description.

Exemplary embodiments of the stripping pliers according to the invention are described in detail below with reference to the drawings which are given by way of illustration only, and thus are not limitative of the present invention, and in which.

DETAILED DESCRIPTION OF THE PREFERRED EMBODIMENTS

A first exemplary embodiment of stripping pliers according to the invention will be described in more detail below with reference to FIGS. 1 to 5.

According to FIGS. 1 to 5, the stripping pliers 1 have a pliers housing 2 to which a handle 3, which is fixed to the housing, is connected, for example in one piece. In these figures, only the rear wall of the pliers housing 2 is shown, there being of course a front wall as well. The same applies correspondingly to the handle 3 which is fixed to the housing. Pivotably mounted on the pliers housing 2 is a movable clamping jaw 4, to be mounted by means of a bearing pin 5 which projects through holes 5a in the clamping jaw 4 and rests in seats which are located on the opposite inner sides of the housing walls of the pliers housing 2. The holes 5a are located in two side walls 6, which are located at a distance from each other on the clamping jaw 4. These side walls 6 rest on the inner sides of the housing walls of the pliers housing 2 and are guided by the latter. At the front end, the movable clamping jaw 4 is designed like a claw and has a clamping surface 7 having furrows. The furrows run parallel to the central axis of the holes 5a. In contrast, at that end of the movable clamping jaw 4 which is opposite the clamping surface 7, there is present on one clamping jaw section 5b an attachment 8 having a cutout 9, the attachment 8 serving to accommodate a pivot pin 10 which likewise extends parallel to the holes 5a. Rotatably mounted around this pivot pin 10 is a control element which is located in the cutout 9, as will be described further.

On the lower pliers housing 2 and at a distance underneath the holes 5a there is located a further pivot pin 11, which is likewise mounted with both ends in the mutually opposite side walls of the pliers housing 2. A movable handle 12 is rotatably mounted around this further pivot pin 11. In this arrangement, the movable handle 12 has at its one end a hole 13 through which the further pivot pin 11 projects. At a small distance from the further pivot pin 11 in the direction towards the rear free end of the handle 12, there is located in the handle 12 a pivot pin 14, around which an articulated lever 15 is pivotably mounted. This articulated lever 15 is arranged centrally in the longitudinal direction of the further pivot pin 14 with respect to the latter and has at its free end a hole through which a pivot pin 16 projects. Instead of the hole, a socket can also be provided for the pivot pin 16. This pivot pin 16 passes through two identical cam discs 18a, 18b, which are located at a distance parallel to each other and are rotatably mounted about an axis 17. The axis 17 runs parallel to the holes 5a and can be accommodated by its ends in the pliers housing 2. In other words, the cam discs 18a, 18b can be rotated about the axis 17 when, during closing of the handles 3 and 12, a force is exerted on the pivot pin 16 via the articulated lever 15. In this arrangement, the axis 17 is located such that, during closing of the handles 3 and 12, the cam discs 18a, 18b are rotated in the clockwise direction in FIG. 1 about the axis 17.

The pivot pin 10 carries a control element designed as a control cam 19. The control cam 19 has at its free end two rollers 20, which in each case roll on part of the peripheral surface 42a, 42b of the cam discs 18a, 18b. When the cam discs 18a, 18b are rotated, the movable clamping jaw 4 is thus driven via the rollers 20 and the control cam 19, as will be described further. Starting from the pivot end position shown in FIG. 1, the control cam 19 itself can rotate only in the clockwise direction about the pivot pin 10, and is pressed by a suitable spring element 21 into the pivot end position. The control cam can project into the region between the two cam discs 18a, 18b.

Figure 1:
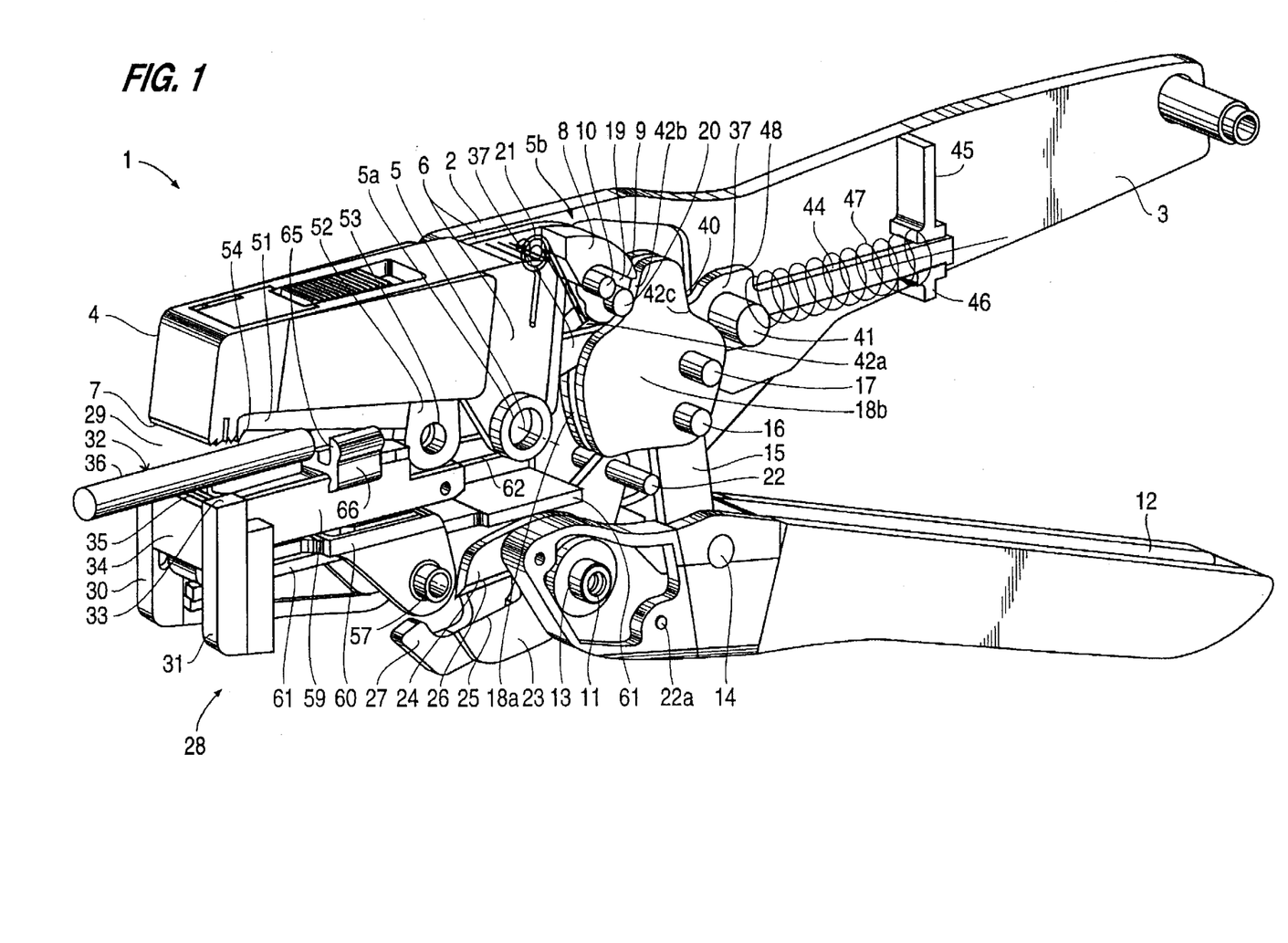
FIG. 1 shows a perspective view of stripping pliers according to a first exemplary embodiment of the invention, obliquely from the front.

FIG. 1 shows the pliers in the open condition, that is to say in a situation in which the handles 3 and 12 have the greatest distance from each other. If the handles 3 and 12 are moved towards each other, the handle 12 moves in the counterclockwise direction around the pivot pin 11 and presses the articulated lever 15 upwards in the direction of the handle 3 which is fastened on the housing. In so doing, as already mentioned, the articulated lever 15 presses the pivot pin 16 upwards and thus rotates the cam discs 18a, 18b about their axis 17 in the clockwise direction in FIG. 1. If the handles 3 and 12 are released, a reverse sequence of movements takes place. In order to bring the handle 12 back into its initial position, a spring which is not shown can be wound around the further pivot pin 11 and can press with its free ends on the one hand against a pin 22 which is fixed to the housing and on the other hand against a pin 22a. The pin 22a is present on the movable handle 12, to be specific in the region between the further pivot pin 11 and the pivot pin 14. If the handles 3 and 12 are guided towards each other, the spring which is not shown is tensioned. When the handles 3 and 12 are released, on the other hand, the said spring presses the handle 12 via the pin 22a in the clockwise direction around the pivot pin 11.

As can further be seen from FIG. 1, a fixed knife element 23 is further arranged on the pin 22 which is fixed to the housing. On the other hand, the other end, projecting beyond the pivot pin 11, of the handle 12 is designed as a further knife element 24, both the knife elements 23 and 24 having blades 25 and 26 pointing towards each other, so that in this way a cutting member is obtained which is closed when the handle 12 is moved towards the handle 3 and vice versa. Designated by the reference symbol 27 is a rest fixed to the housing, which is used for positioning stranded material intended to be cut with the cutting member.

The stripping pliers have a second or lower clamping jaw 28, which is connected firmly to the pliers housing 2. Between the upper or movable clamping jaw 4 and the lower clamping jaw 28, fixed to the pliers, there is thus a mouth 29 of the pliers. The lower clamping jaw 28 has two stationary jaw walls 30, 31 which are located parallel to each other at a distance and have upper stop surfaces 32, 33, against which the clamping surface 7 of the upper clamping jaw 4 strikes when the mouth 29 of the pliers is closed. Located between the two jaw walls 30 and 31 is a clamping element 34, which is mounted so that it is compliant downwards. On an upward-pointing clamping surface 35, a conductor 36 which is to be stripped comes to rest, and is then clamped between the clamping surfaces 7 and 35 when the mouth 29 of the pliers is closed. This will be discussed in more detail further below.

In the stripping pliers 1, there is an essentially horizontally located pull-rod 37, which is mounted such that it can be displaced in the longitudinal direction of the pliers. This pull-rod 37 has, at its end pointing towards the mouth 29 of the pliers, a horizontal through-hole 38 for accommodating a pivot pin 39. Through-hole 38 and pivot pin 39 can be seen in FIG. 2. In this arrangement, the pivot pin 39 can also be moved to and fro in the longitudinal direction of the pliers, that is to say it is not mounted in a fixed position in the pliers housing 2.

In the direction towards the rear end of the pliers, the pull-rod 37 runs through the region between the cam discs 18a, 18b and then has two lateral attachments 40, 41, which are used for driving the pull-rod 37 via the cam discs 18a, 18b. The attachments 40, 41 slide on the transport curves 42c of the cam discs 18a, 8b. Via its attachments 40, 41, the pull-rod 37 is also guided in longitudinal slots which are located in the lateral housing walls of the pliers housing 2 and extend in the horizontal direction or longitudinal direction of the pliers. They permit a forward and backward movement of the pull-rod 37.

Adjacent to its attachments 40, 41, the pull-rod 37 changes into an adjusting rod 44. This adjusting rod 44 is essentially designed as a straight rod and is located in the upper handle 3, or that fastened to the housing. That end of the adjusting rod 44 which faces the end of the pliers is led between two stops 45 and 46, which are located in a fixed position at the rear end of the handle 3. In addition, a compression spring 47, which is supported on one side on the stops 45 and 46 and on the other side, for example, on a widening 48 of the adjusting rod 44 in its region pointing towards the mouth 29 of the pliers, is located on the adjusting rod 44. If the handles 3 and 12 are moved towards each other and the adjusting rod 44 is pressed via the cam discs 18a, 18b and the attachments 40, 41 towards the rear in the direction of the free end of the handle 3, the compression spring 47 is compressed or stressed. When the handles 3 and 12 are released, the compression spring 47 then presses the pull-rod 37 once more in the direction towards the mouth 29 of the pliers. During the entire movement, the adjusting rod 44 remains guided by the stops 45 and 46 and the attachments 40, 41 (which can also, for example, be designed as rollers).

In the mouth 29 of the pliers, a stripping claw 51 is located on the underside of the movable clamping jaw 4 and behind the clamping surface 7. This stripping claw 51 is provided at its rear end with a tab 52 in which there is a through-hole 53. The pivot pin 39, which also runs through the through-hole 38 of the pull-rod 37, projects through this through-hole 53. Therefore, if the pull-rod 37 is displaced in the longitudinal direction of the stripping pliers, at the same time the stripping claw 51 is thus displaced in the longitudinal direction of the pliers. At the same time, a relative displacement occurs between the stripping claw 51 and the movable clamping jaw 4. At the front end, the stripping claw 51 has an appropriately designed cutting edge 54 which, when the mouth 29 of the pliers is closed, penetrates into the insulation of a conductor 36 which is clamped in the mouth 29 of the pliers. If the mouth 29 of the pliers is closed by pivoting the clamping jaw 4, the stripping claw 51 is also moved in the direction of the conductor 36 by means of the guiding of the clamping jaw 4. Only then does the longitudinal displacement of the stripping claw 51 take place, as will be described further.

The cutting edge 54 can be formed, for example, by cutting tips of a plurality of laminates, which are all designed in the same manner and are mounted such that they can pivot about a pivot which is fastened to the side walls of the stripping claw 51. A flexible device, for example a flexible cushion, can be located underneath the free laminate ends in order to permit compliance of the laminates.

The construction of the lower clamping jaw 28 is described below.

As already mentioned, the stationary jaw walls 30, 31 with their upper stops surfaces 32 and 33 belong to the lower clamping jaw 28. The following further devices are provided between these two jaw walls 30 and 31: a laminate cassette 59, a clamping arm 60, a leaf spring 61 and guide tracks 62 for the laminate cassette 59.

The laminate cassette 59 is guided on the guide tracks 62, of which only one can be seen in FIG. 1. In fact, there are two guide tracks 62 on the housing side walls of the pliers housing 2, and they are horizontally aligned. The laminate cassette 59 can then rest on these guide tracks 62 and can correspondingly be moved forwards and backwards in the longitudinal direction of the pliers. Lateral guidance of the laminate cassette 59 can likewise be carried out via the housing side walls of the pliers housing 2.

The drive for the forward and backward movement of the laminate cassette 59 is carried out via a coupling of the laminate cassette 59 to the pull-rod 37. For this purpose, the laminate cassette 59 has a flange which is connected to it in one piece and has a through-hole, through which the pivot pin 39, which has already been mentioned, likewise passes. The pull-rod 37, the laminate cassette 59 and the stripping claw 51, via the tab 52, are thus mounted such that they can pivot about this pivot pin 39.

During its forward and backward movement on the guide tracks 62, the laminate cassette is pressed against these guide tacks 62, to be specific with the aid of a compression spring 65 which is arranged in the mouth 29 of the pliers. The upper end of the compression spring 65 is supported in a seat on the underside of the stripping claw 51, while the lower end of the compression spring 65 is supported on an adjusting element 66, which is plugged onto the upper side of the laminate cassette 59. This adjusting element 66 can be displaced in the longitudinal direction of the laminate cassette 59, in order to determine how far the end of a conductor can be inserted into the mouth 29 of the pliers. The length of the conductor insulation to be drawn off can thus be predetermined by positioning the adjusting element 66 in the longitudinal direction of the pliers. This adjusting element 66 serves as a stop for the conductor end.

Inside the laminate cassette 59 there is a laminate stack, not shown further, comprising a multiplicity of laminates which are arranged alongside one another and can be moved transversely to the mouth longitudinal direction and have cutting edges which, when the mouth 29 of the pliers is closed, penetrate from below into an insulation of a conductor 36 which is held by the clamping jaws 4 and 28. Provided on the rear of the laminate stack is a laminate-guiding device which is matched to the profile of the conductor and determines the laminate transverse movement appropriately. By means of this laminate-guiding device, the laminates, which can be rigid or more or less flexible, are guided such that, when they are loaded with pressure by the conductor, they are not able to yield to such an extent in the edge region of the conductor as in the central region of the conductor. By means of the laminate-guiding device, excessive pivoting away during the deflection of the laminates in the edge region of the conductor is thus virtually prevented, so that these laminates located in the edge region of the conductor can penetrate further into the conductor insulation, which leads to an improved stripping result. If the laminates have a certain inherent elasticity, it is also possible to strip conductors having a profile to which the laminate-guiding device is not exactly matched. However, in any case, here too those laminates located on the outside penetrate better with their cutting edges into the conductor insulation, so that even in this case satisfactory results are possible.

The more detailed construction of the laminate-guiding device is described in German Patent Application P 44 20 050.1. The laminate-guiding device itself is provided on the upper surface of the clamping arm 60, while the cutting force necessary for stripping the conductor end is applied by the leaf spring 61.

The precise operating sequence of the stripping pliers according to the invention is described below with reference to FIGS. 2 to 5.

Figure 2:
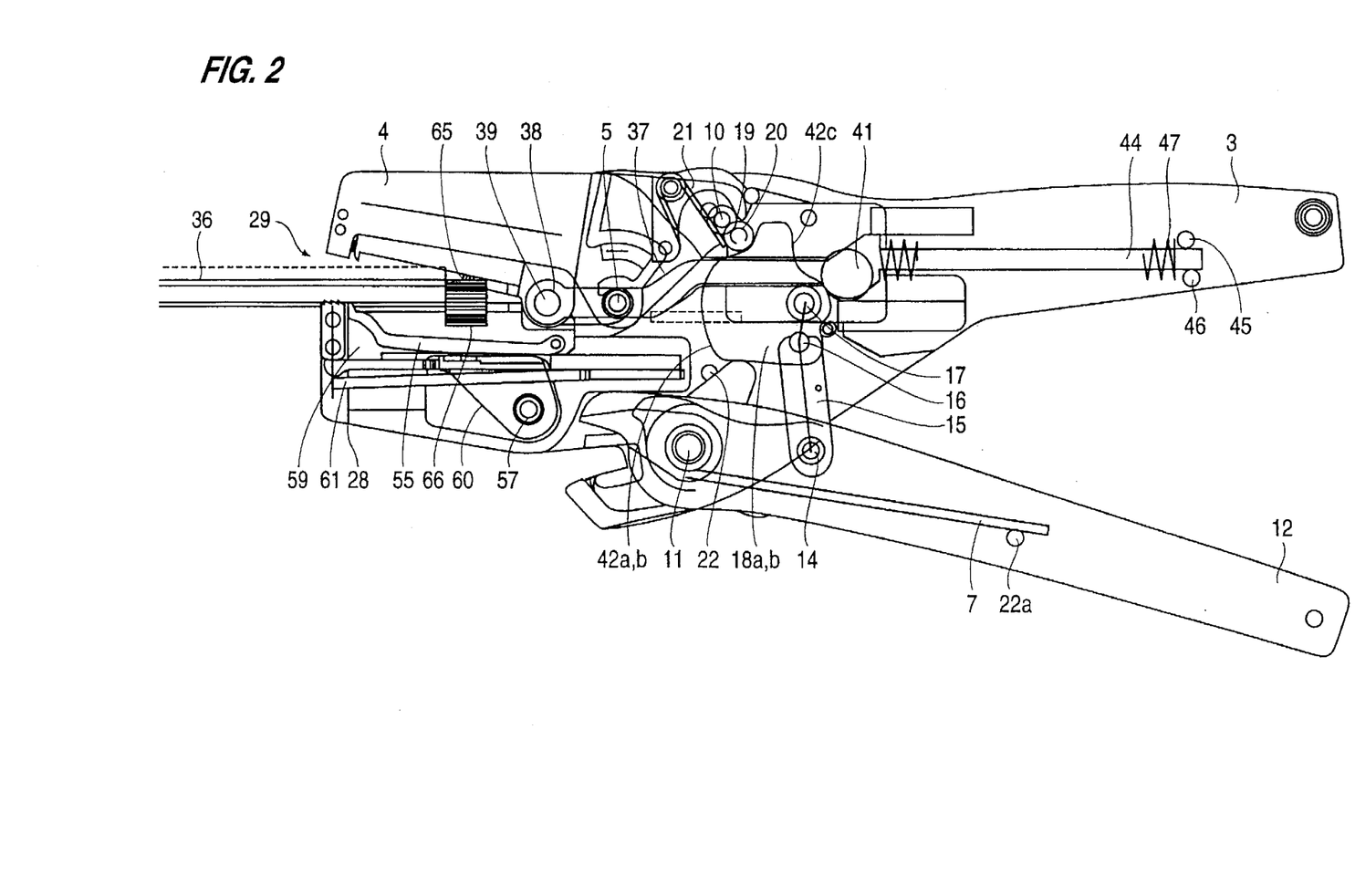
FIG. 2 shows a side view of the stripping pliers according to FIG. 1 with the mouth of the pliers open.

FIG. 2 shows the stripping pliers in the rest position, that is to say with the mouth 29 of the pliers open and the handles 3 and 12 at the greatest distance from each other. The cam discs 18a, 18b are then pivoted to the furthest extent in the counterclockwise direction about the axis 17 and the pull-rod 37 is displaced to the furthest extent in the direction towards the mouth 29 of the pliers. The control cam 19 also assumes its end position pivoted to the furthest extent in the counterclockwise direction.

Figure 3:
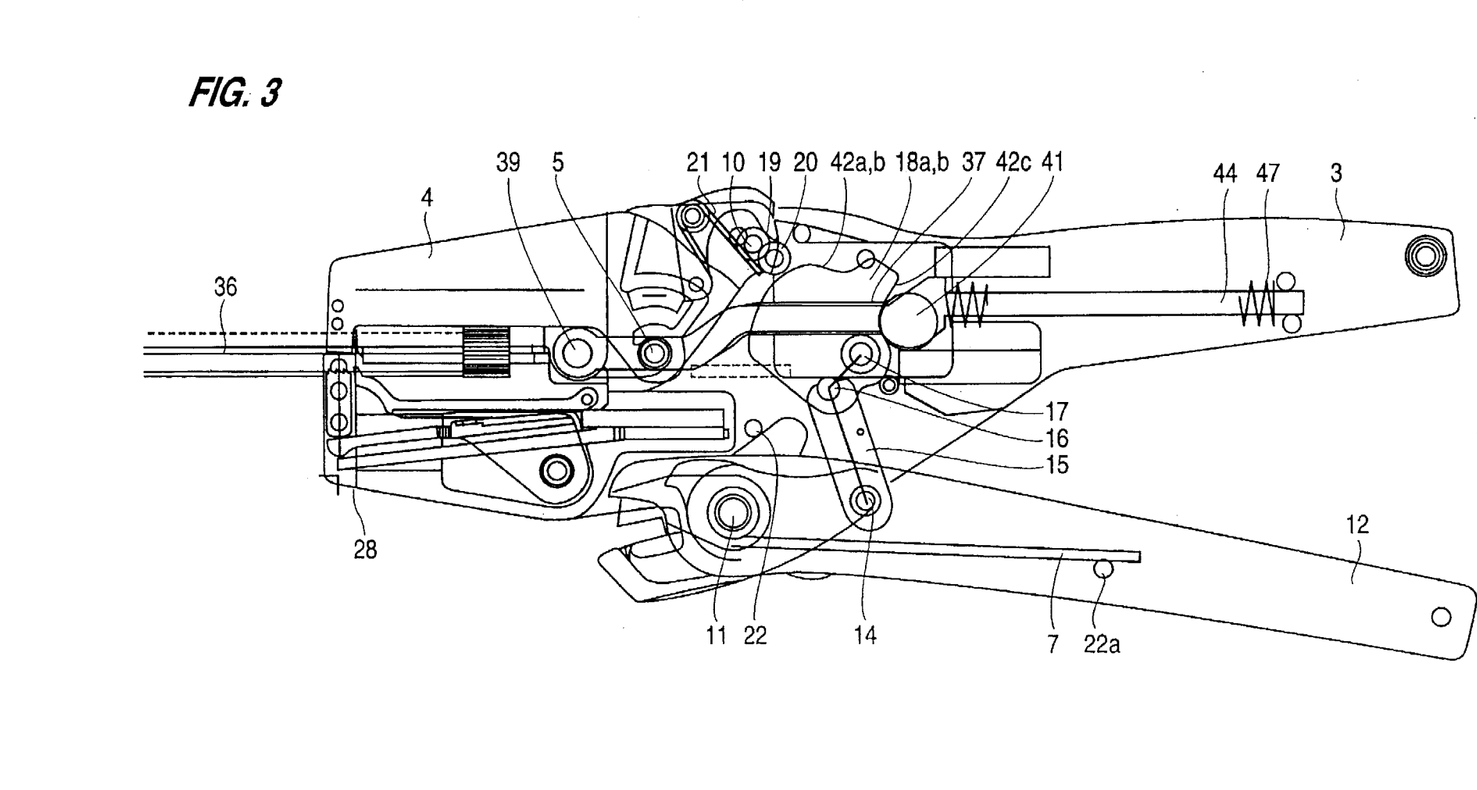
FIG. 3 shows the side view according to FIG. 2 with a conductor clamped in but not yet stripped.

If, according to FIG. 3, the handles 3 and 12 are then moved towards each other, the articulated lever 15 deflects in the counterclockwise direction around the pivot pin 14 and at the same time rotates the cam discs 18a, 18b in the clockwise direction about the axis 17. The transport curves 42c of the cam discs 18a, 18b are in this case designed in such a way that in this condition the attachments 40, 41 are not yet loaded and hence the pull-rod 37 initially maintains its initial position. In contrast, the clamping curves 42a, 42b of the cam discs 18a, 18b, on which the rollers 20 of the control cam 19 roll, are designed such that the movable clamping jaw 4 is pivoted in the counterclockwise direction about the pivot pin 5, which leads to the closing of the mouth 29 of the pliers. At the same time, the control cam 19 cannot deflect in a direction counter to the clockwise direction about the pivot pin 10 which carries it. The conductor insulation is now cut by the laminates; the cutting force remains essentially constant, since the elements 7 and 32, 33 are resting on one another.

Figure 4:
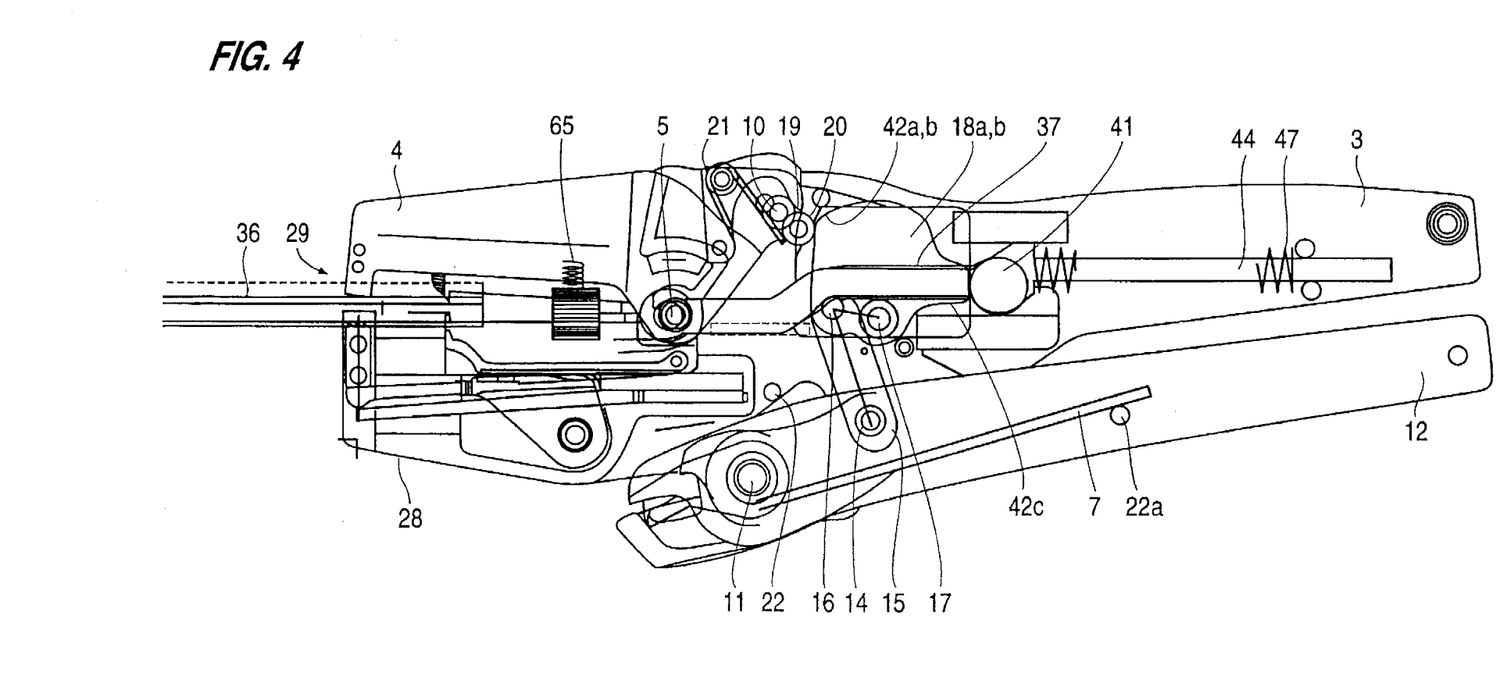
FIG. 4 shows the side view according to FIG. 2 with the conductor stripped and the mouth of the pliers opened slightly, when the handles are still closed.

During still further pivoting of the handles 3 and 12 towards each other, according to FIG. 4, the rollers 20 of the control cam 19 finally roll over the end of the clamping curves 42a, 42b and can then rotate a little in the clockwise direction about the pivot pin 10, so that the mouth 29 of the pliers can now open a little in order to release the conductor 36. The corresponding rotation of the movable clamping jaw 4 in the clockwise direction about the pivot pin 11 is made possible by the compression spring 65 located in the mouth of the pliers, the spring attempting to spread the clamping jaws 4, 28. On the way to this end position, the attachments 40, 41 on the pull-rod 37 are also acted on by the transport curve 42c of the cam discs 18a, 18b in such a way that the pull-rod 37 is moved in the direction towards the rear end of the pliers. As a result, the conductor insulation which has already been severed is drawn off from the conductor 36. At the same time, the compression spring 47 is stressed. Likewise, during the above described movement sequence, the spring element 21 is also pretensioned, which attempts to rotate the control cam 19 counter to the clockwise direction about the pivot pin 10.

Figure 5:
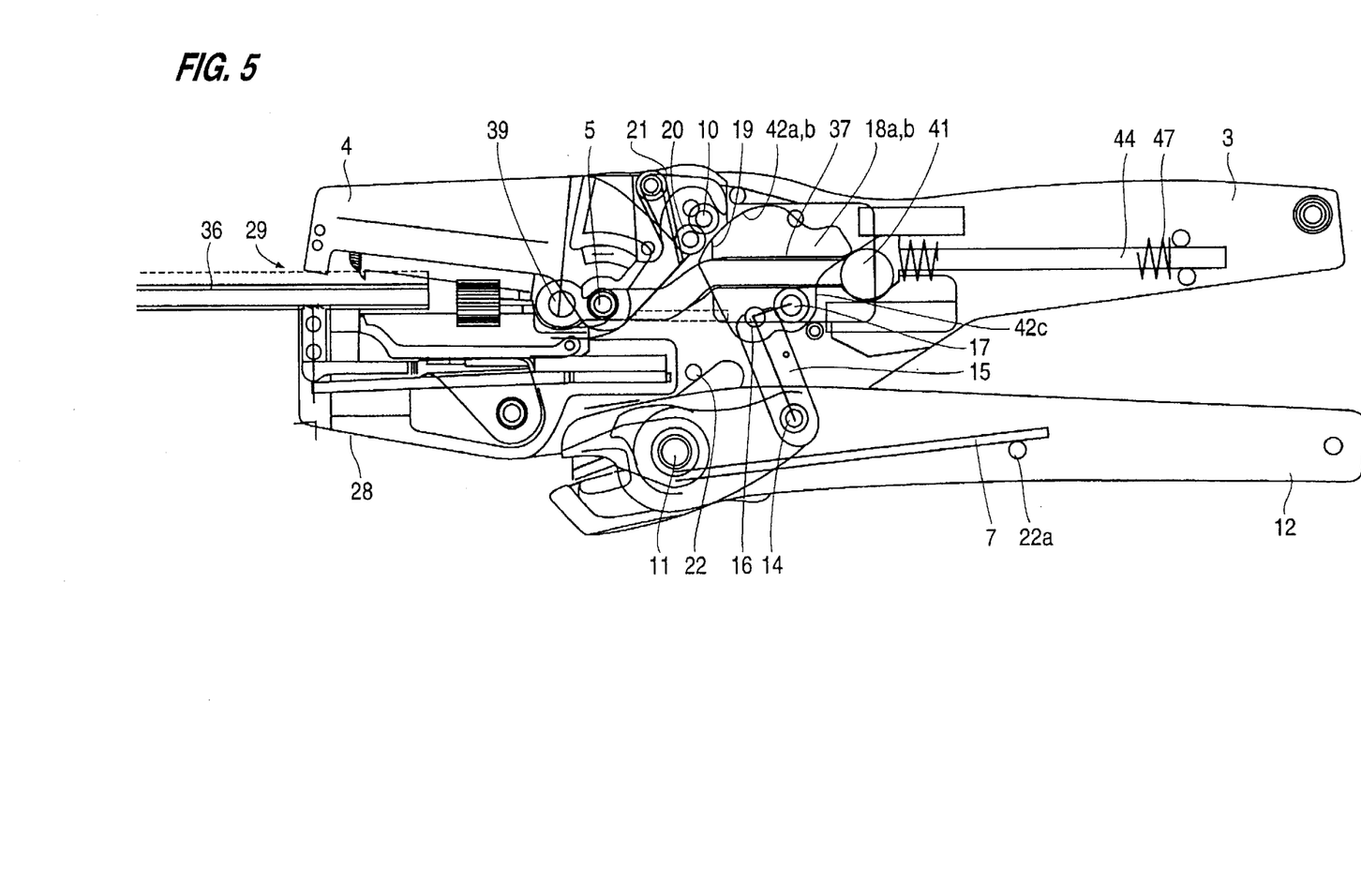
FIG. 5 shows the side view according to FIG. 2 with the handles being opened.

If, according to FIG. 5, the handles 3 and 12 are then released, the movable handle 12 is pressed away from the handle 3 which is fixed to the housing by the spring which was already mentioned at the beginning, this spring being provided with the reference symbol F in FIGS. 2 to 5. The spring is wound around the pivot pin 11 and is supported on the pins 22 and 22a. In the process, the articulated lever 15 is also drawn downwards and with it the cam discs 18a, 18b are rotated counter to the clockwise direction about the axis 17. The transport curve 42c permits the pull-rod 37 to run back in the direction of the mouth 29 of the pliers, while the control cam 19 is then rotated by the clamping curves 42a, 42b in the clockwise direction about the pivot pin 10, so that the mouth 29 of the pliers remains open. The spring element 21 is stressed further in the process. Finally, the stripping pliers reach their rest position once more, so that then the clamping curves 42a, 42b permit the control cam 19 to be guided back into its end pivoting position, to be specific by the action of the spring element 21. As already mentioned, starting from its end pivoting position, the control cam 19 can be rotated only in the clockwise direction in FIGS. 2 to 5 about the pivot axis 10, while it is continuously blocked in the other direction. Finally, the pliers once more assume their rest position shown in FIG. 2.

Figure 6:
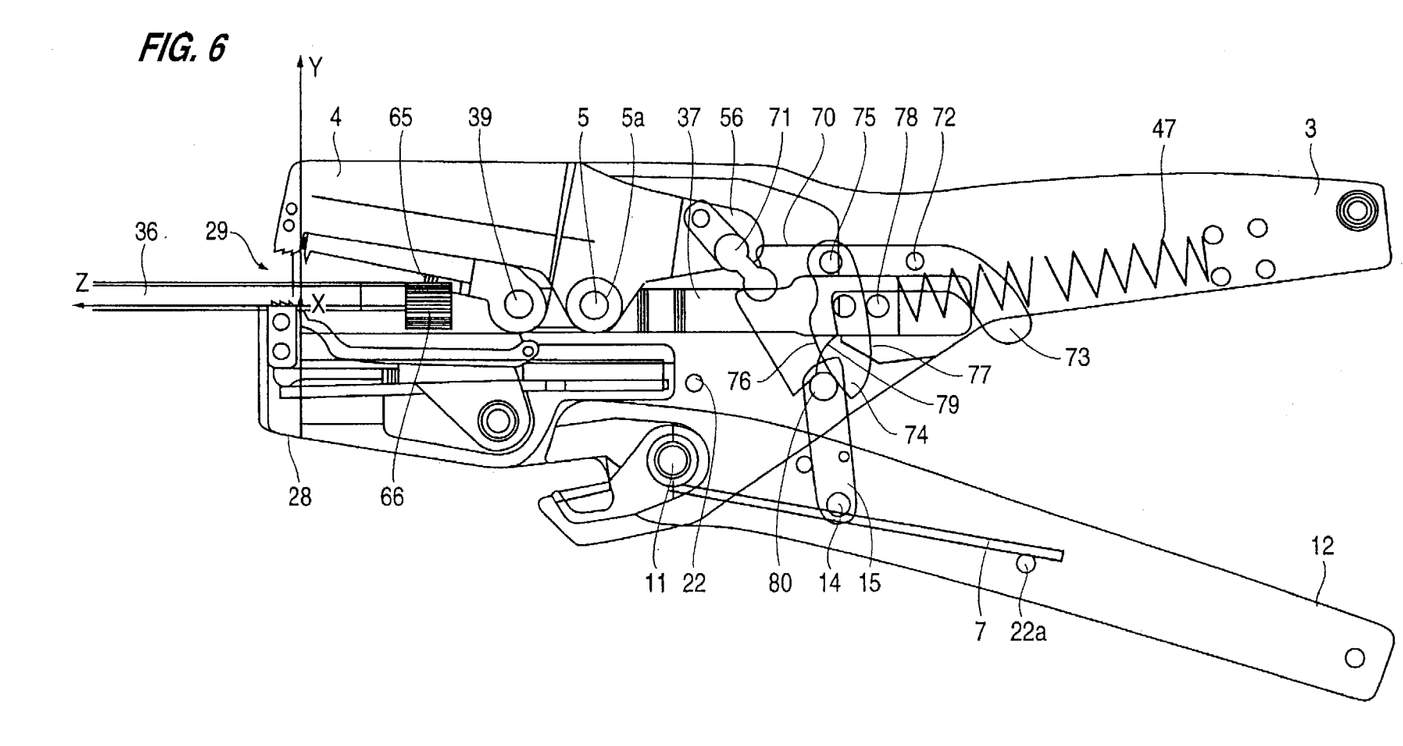
FIG. 6 shows a second exemplary embodiment of stripping pliers according to the invention.

A second exemplary embodiment of the stripping pliers according to the invention is shown in FIG. 6. The same parts as in FIGS. 1 to 5 are provided with the same reference symbols and are not explained again.

In contrast to FIGS. 1 to 5, provision is made here for a cam disc 70 which is always coupled in articulated fashion to the movable clamping jaw 4 via a connecting element 71. The articulated coupling via the connecting element 71 is carried out in a section 5b of the pivotable clamping jaw 4 which projects beyond the pivot axis 5 for the clamping jaw 4 towards the rear end of the pliers. The cam disc 70 itself is mounted so that it can rotate about an axis 72 which is fitted to the handle 3 which is fixed to the housing. In this arrangement, the cam disc 70 is connected to an attachment 73 which points beyond the axis 72 towards the rear end of the pliers and, in the pivoting region of the pivotable handle 12, projects out of the handle 3 which is fixed to the housing.

Between the pivot 72 of the cam disc 70 and the connecting element 71, an actuating lever 74 is articulated on the cam disc 70, to be specific by means of a pivot pin 75. The actuating lever extends in the direction of the articulated lever 15 and has a front guide edge 76, pointing towards the mouth 29 of the pliers, and a guide edge 77 pointing towards the rear end of the pliers. The rear guide edge 77 is in contact with an attachment 78 which is fastened to the pull-rod 37. In contrast, the front guide edge 76 of the actuating lever 74 points to a clamping curve 79 of the cam disc 70. The articulated lever 15, which can pivot about the pin 14, has an actuating pin 80 which, when the handles 3, 12 are closed, can be moved into the region between the clamping curve 79 of the cam disc 70 and the front guide edge 76 of the actuating lever 74. At the same time, the guide edges 76, 77 and the clamping curve 79 run in such a way that, when the handles 3, 12 are closed, the cam disc 70 is firstly rotated about its axis 72 in the clockwise direction in FIG. 6, so that the movable clamping jaw is rotated, via the connecting element 71, in the counterclockwise direction about the pivot axis 5, and the mouth of the pliers thus closes. Only then, by means of the actuating pin 80, is the actuating lever 74 pivoted via its front guide edge 76 in the counterclockwise direction about the pivot pin 75 and therefore drives the push-rod 37, via the attachment 78, in the direction towards the rear end of the pliers. At the same time, a relatively low-impact behavior of the stripping pliers can be established by means of the profile of the guide edges 76, 77 and of the clamping curve 79. If the handles 3 and 12 are completely closed, the movable handle 12 strikes against the attachment 73, so that the cam disc 70 is rotated in the clockwise direction about the axis 72, which leads to the movable clamping jaw 4 being able to rotate a little in the clockwise direction about the pivot pin 5, as a result of which the mouth 29 of the pliers opens slightly, so that removal of the conductor 36 is possible. If subsequently the released handles 3, 7 are spread by the spring F, the compression spring 65, which is present in the mouth 29 of the pliers, presses the movable clamping jaw further in the clockwise direction in FIG. 6 about the pivot pin 5 and hence presses the cam disc 70 in the counterclockwise direction about the axis 72 back into its initial position. The actuating rod, which is connected to the rear end of the pull-rod 37, is not shown here for reasons of clarity. Two parallel cam discs can also be used here in a manner analogous to the first exemplary embodiment.

Figure 7:
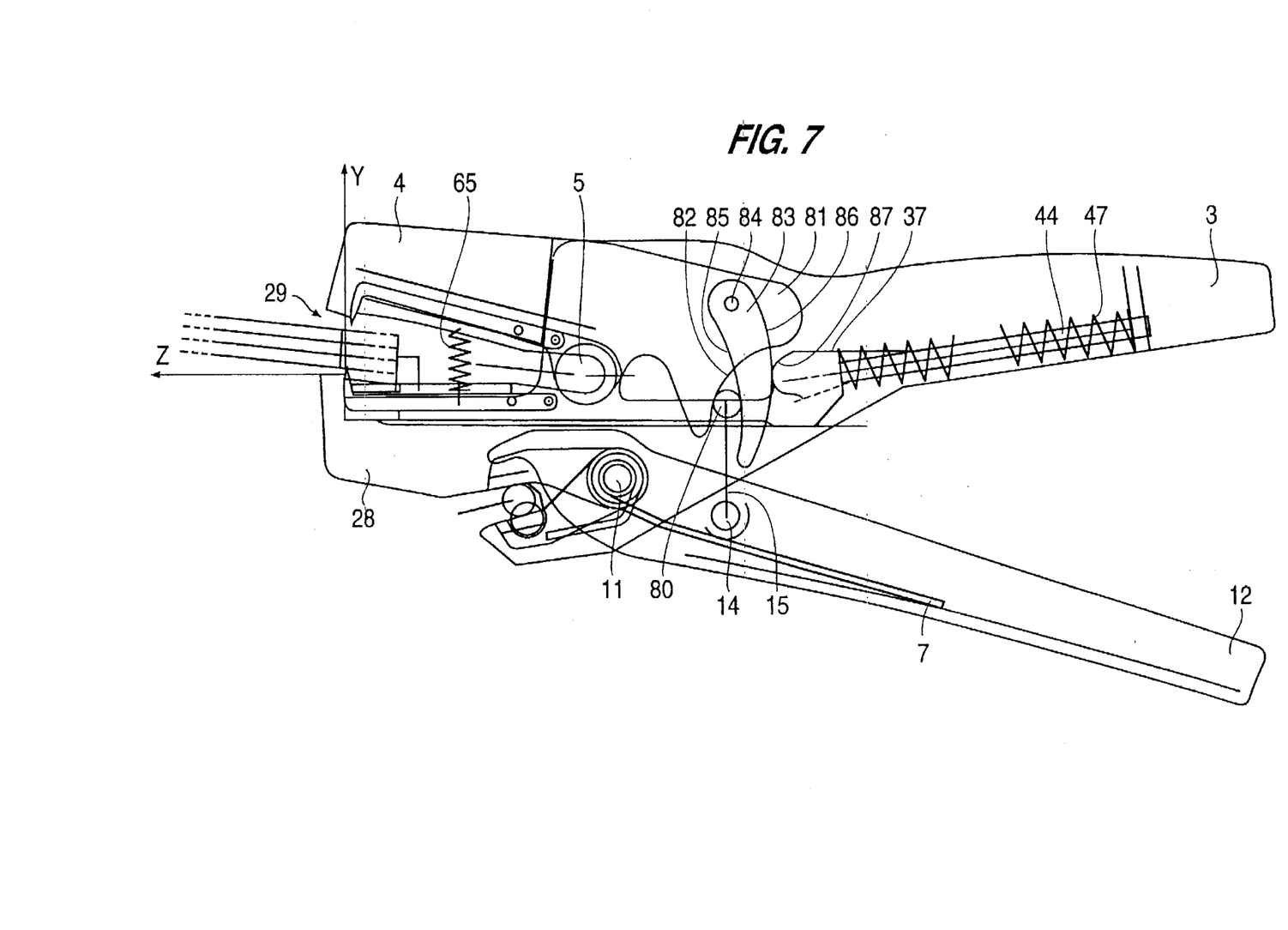
FIG. 7 shows a third exemplary embodiment of stripping pliers according to the invention.

A third exemplary embodiment of the stripping pliers according to the invention is shown in FIG. 7. Here, too, the same elements as in FIGS. 1 to 6 are provided with the same reference symbols and are not described again.

In the case of this exemplary embodiment, a cam disc 81 (or a pair of cam discs) is formed on a section of the pivotable clamping jaw 4 which projects beyond the pivot axis 5 of the clamping jaw 4 towards the rear end of the pliers. The clamping curve of the cam disc 81 is provided here with the reference symbol 82. This cam disc 81 can be driven via the articulated lever 15, the actuating pin 80 arranged on the free end of the articulated lever 15 sliding along on the clamping curve 82. If the handles 3 and 12 are moved towards each other, the clamping jaw 4 is moved via the actuating pin 80 in the counterclockwise direction in FIG. 7 about the pivot pin 5 and the mouth 29 of the pliers is thus closed.

On that rear section of the cam disc 81 which points towards the end of the pliers, an actuating lever 83 which extends towards the pivotable handle 12 and is designed in a sickle shape is articulated by means of a pin 84. The actuating lever 83 has a front guide edge 85, pointing towards the mouth 29 of the pliers, and a rear guide edge 86, pointing towards the end of the pliers. The rear guide edge 86 is in contact with an attachment 87 which is fastened to the pull-rod 37.

If the handles 3 and 12 are closed, the adjusting pin 80 is moved from below into the region between the clamping curve 82 and the front guide edge 85 of the actuating lever 83, the profile of the clamping curve 83 and of the guide edges 85, 86 being selected in such a way that the pull-rod is moved via the attachment 87 towards the rear end of the pliers only after the conductor insulation has been severed in the mouth 29 of the pliers. Here, too, by means of an appropriate profile of clamping curve 82 and guide edges 85, 86, low-impact operation of the stripping pliers can be established. If two parallel cam discs 81 spaced apart are provided, the actuating lever 83 may be located between them.

A modification of the first exemplary embodiment of the invention will be described in more detail below with reference to FIGS. 8 and 9. In this case, the same elements as in FIGS. 1 to 5 are provided with the same reference symbols and are not described again.

Figure 8:
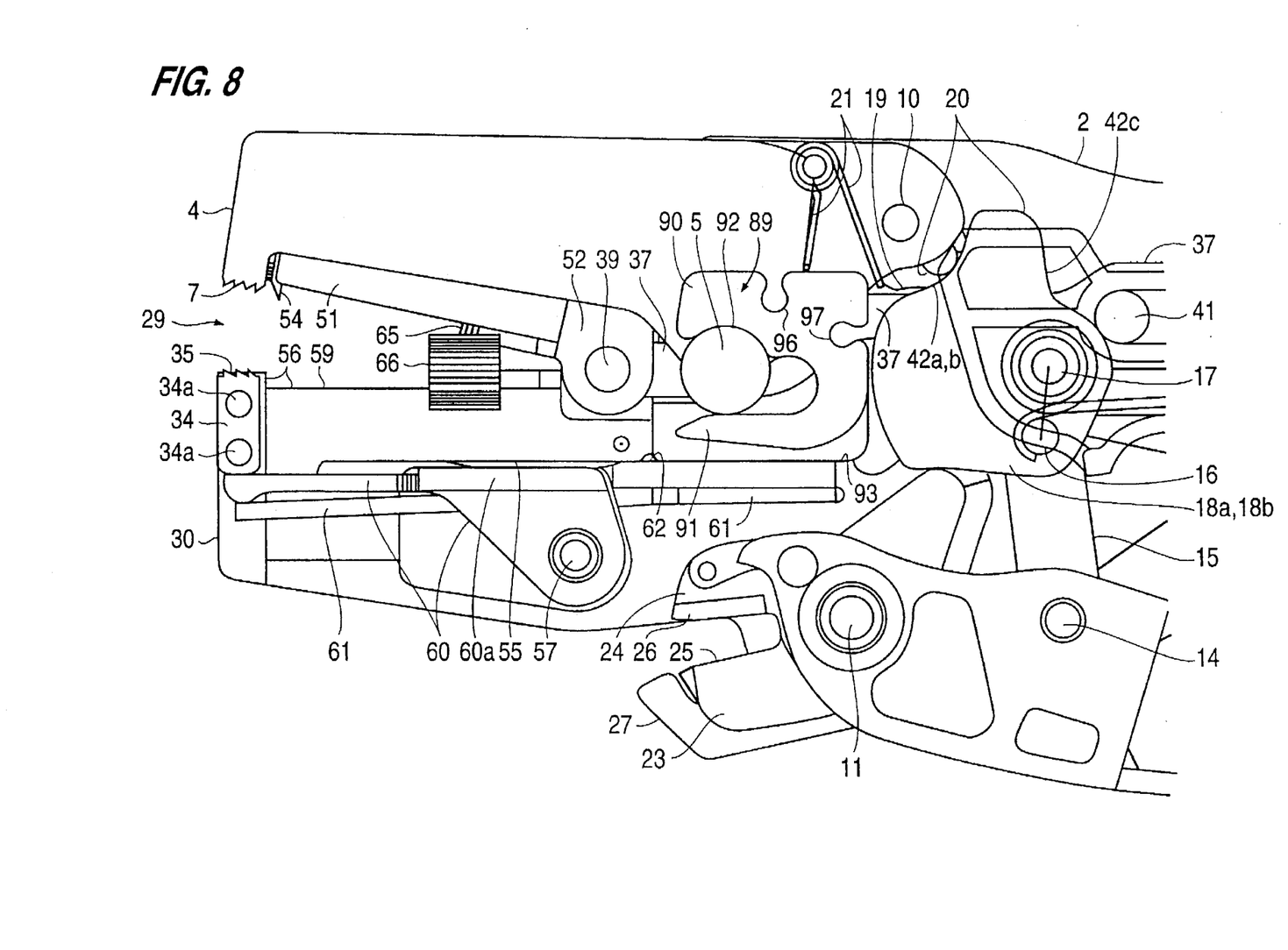
FIG. 8 shows a modification of the first exemplary embodiment of the invention in a side view.
Figure 9:
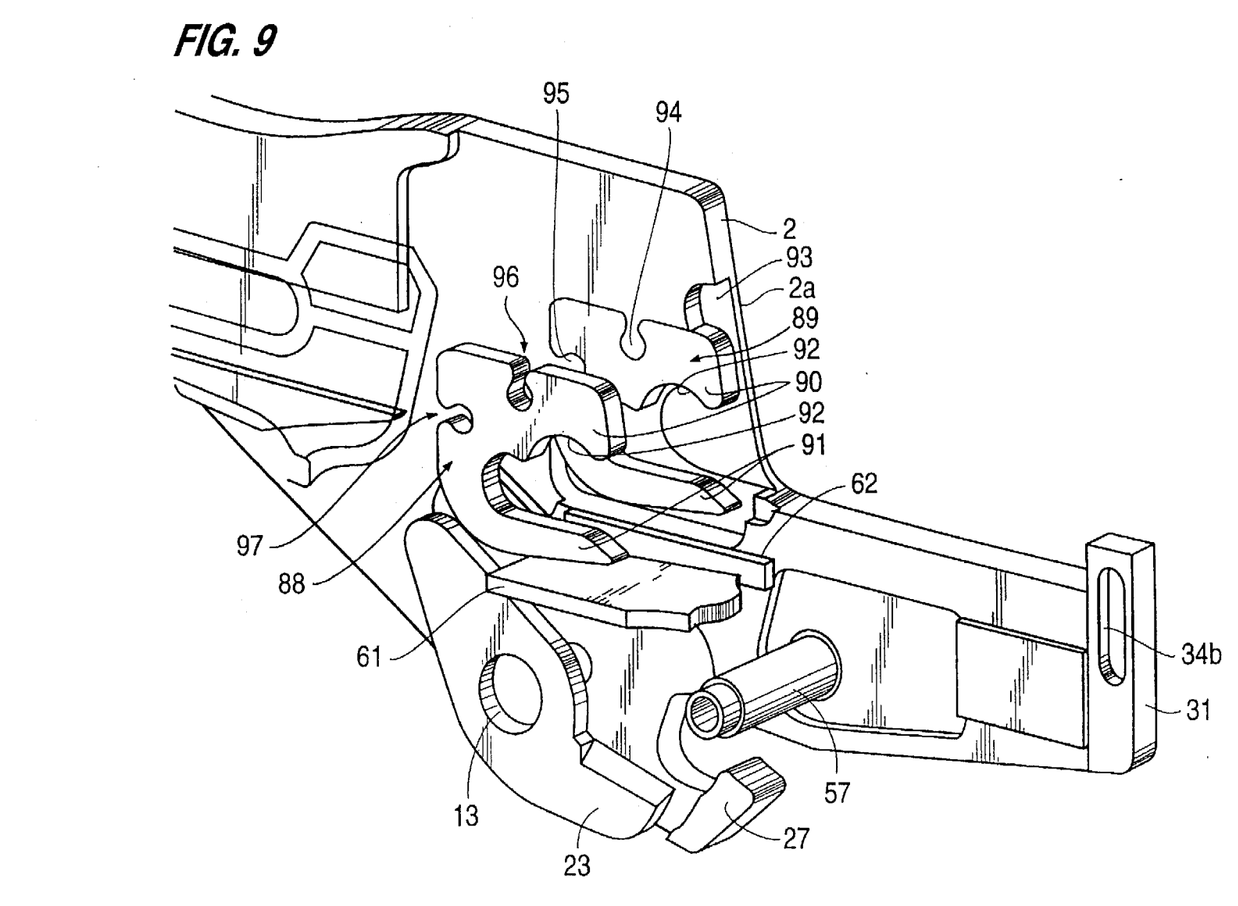
FIG. 9 shows a perspective view of the modification of the first exemplary embodiment of the invention, obliquely from the front.

According to FIGS. 8 and 9, the pivotable clamping jaw 4 is firmly connected to the bearing pin 5. This bearing pin 5 can also be formed by two lateral attachments on the movable clamping jaw 4 which are connected, for example in one piece, to the movable clamping jaw 4. The bearing pin 5 or the lateral attachments project laterally outwards beyond the movable clamping jaw 4. On both sides of the movable clamping jaw 4 there is located a bearing plate 88, 89, which is in each case parallel to the side surfaces of the movable clamping jaw 4. Each of these bearing plates 88, 89 has two limbs 90, 91, which are located essentially horizontally and whose free ends point in the direction towards the mouth 29 of the pliers. The bearing pin 5 can be latched in a clamped manner between these limbs 90, 91, for which purpose essentially the respectively lower limb 91 can yield resiliently with respect to the upper limb 90, while the respectively upper limb 90 has a concave cutout 92 which nestles against part of the periphery of the bearing pin 5.

The bearing plates 88, 89 are in each case inserted into a lateral depression 93 which is located on the inner side of the side wall of the pliers housing 2. These depressions 93 are designed in such a way that the bearing plates 88, 89 can be sunk completely, that is to say aligned with the inner surfaces of the side walls of the pliers housing 2. In this arrangement, the depressions 93 have a flat extent such that the respectively lower limb 91 of each bearing plate 88, 89 can yield resiliently when it is pressed way from the upper limb 90 during removal or insertion of the bearing pin 5. In the direction towards the mouth 29 of the pliers, the depressions 93 are drawn so far forwards that they reach the front edge of the side walls of the pliers housing 2. Such a front edge of the side wall of the pliers housing 2 is provided in FIG. 9 with the reference symbol 2a. This end 2a ends at the front where the space for accommodating the movable clamping jaw 4 beings.

In order to hold the bearing plates 88, 89 in the lateral depressions 93, attachments 94, 95, which are designed in the shape of a drop, project into these depressions 93 from above and from behind. These attachments 94, 95 engage with a snug fit in cutouts 96, 97 which are located at the margin in the bearing plates 98 and 99 respectively at the top and rear. In this arrangement, the bearing plates 88, 89 nestle at the top and at the rear with a snug fit against the corresponding profile of the depressions 93, so that secure holding of the bearing plates 88, 89 in the depressions 93 is ensured.

If the movable clamping jaw 4 in FIG. 8 is intended to be detached from the pliers housing 2, it needs merely to be pulled forwards, in order to pull the bearing pin 5 out of the bearing plates 88, 89 in this direction. In the process, the roller 20 is also automatically detached from the clamping curve 42a, 42b of the cam disc arrangement 18a, 18b. The interior of the pliers is now accessible, so that for example the laminate cassette 59 or parts located below it can be exchanged, after the pull-rod 37 has been guided into its rearmost position.

Exchanging the laminate cassette 59 may be necessary, for example, because it has to be equipped with new laminates 55 because the cutting edges 56 have become blunt as a result of long use.

However, removal of the laminate cassette 59 may become necessary if the laminate-guiding device which is present below it has to be exchanged as a consequence of the use of other conductor cross-sections. This laminate-guiding device is located in the region 60a of the clamping arm 60 and is inserted as a plate in the latter parallel to the lower surface of the laminate cassette 59. As has already been described in German Patent Application P 44 20 050.1, this plate has at the margin a V-shaped cutout, so that the laminates 55 can yield in a different manner over the conductor cross-section. The clamping arm 60 can be pivoted about the pivot 57 and is pressed upwards in the direction of the movable clamping jaw 4 by means of the leaf spring 61. At the same time, the clamping element 34 is also pressed via the clamping arm 60 in the direction towards the movable clamping jaw 4, the clamping element 34 being guided with lateral pins 34a in vertical cutouts 34b which are located in the jaw walls 30 and 31.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:

1. Stripping pliers comprising:
   a pliers housing;
   two clamping jaws pivotable relative to each other, the clamping jaws being connected to the pliers housing, a mouth of the pliers being formed between the two clamping jaws;
   at least one stripping member being positioned in the mouth, the at least one stripping member being displaceable in a longitudinal direction of the mouth; two handles pivotable relative to each other, the handles being connected to the pliers housing, a first one of the handles and a first one of the clamping laws being rigidly connected to the pliers housing, the first clamping jaw being on a side of the housing opposite to a side having the first handle, a second one of the handles and a second one of the clamping laws being pivotably mounted on the pliers housing;
   a drive device in the pliers housing, the drive device being operatively connected to the at least one stripping member and including at least one cam disc, the drive device being driven by pivoting of the handles, driving of the drive device pivots the clamping jaws relative to each other and longitudinally displaces the stripping member, the at least one cam disc controlling pivoting of the clamping jaws and longitudinal displacement of the stripping member during driving of the drive device; and
   a control element mounted on the second clamping jaw, the second clamping jaw having a section projecting beyond a pivot axis of the clamping jaw towards a rear end of the pliers, the control element being articulated on the section of the second clamping jaw, the control element cooperating with a guide surface of the at least one disc during driving of the drive device.

2. The stripping pliers according to claim 1, wherein the control element is a control cam having at least one roller at a free end thereof, the control element being pivoted only over a limited angular range.

3. The stripping pliers according to claim 2, further comprising a spring for urging the control cam into an end pivoting position, the control cam pointing towards the rear end of the pliers when in the end pivoting position.

4. The stripping pliers according to claim 1, further comprising an articulated lever coupled to one of the handles, at least the handle to which the articulated lever is coupled being pivotable, the articulated lever driving the at least one cam disc of the drive device upon pivoting of the handle.

5. The stripping pliers according to claim 1, further comprising a pull-rod for operatively connecting the drive device to the at least one stripping member, the pull-rod having a stop mounted thereon, the at least one cam disc having a surface engageable with the stop mounted on the pull-rod whereby the at least one cam disc controls movement of the pull-rod and longitudinal displacement of the at least one stripping member.

6. The stripping pliers according to claim 1, wherein two stripping members are provided as the at least one stripping member, the stripping members being on each side on the mouth.

7. Stripping pliers comprising:

a pliers housing;

two clamping jaws pivotable relative to each other, the clamping jaws being connected to the pliers housing, a mouth of the pliers being formed between the two clamping jaws;

at least one stripping member being positioned in the mouth, the at least one stripping member being displaceable in a longitudinal direction of the mouth;

two handles pivotable relative to each other, the handles being connected to the pliers housing, a first one of the handles and a first one of the clamping jaws being rigidly connected to the pliers housing, the first clamping jaw being on a side of the housing opposite to a side having the first handle, a second one of the handles and a second one of the clamping jaws being pivotably mounted on the pliers housing;

a drive device in the pliers housing, the drive device being operatively connected to the at least one stripping member and including at least one cam disc, the drive device being driven by pivoting of the handles, driving of the drive device pivots the clamping jaws relative to each other and longitudinally displaces the stripping member, the at least one cam disc controlling pivoting of the clamping jaws and longitudinal displacement of the stripping member during driving of the drive device;

a connecting element for coupling the at least one disc cam to a section of the second clamping jaw, the section of the second clamping jaw projecting beyond a pivot axis of the clamping jaw towards a rear end of the pliers; and an articulated lever coupled to the second handle, the at least one disc cam being driven by the articulated lever, the articulated lever having a free end in contact with a guide surface of the at least one cam disc, the at least one disc cam being pivotable about a pivot, the at least one disc cam further having at least one attachment projecting beyond the pivot towards the rear end of the pliers, the at least one attachment being projectable outside of the first handle upon pivoting of the at least one disc cam.

8. The stripping pliers according to claim 7, further comprising a pull-rod and at least one actuating lever, the pull-rod operatively connecting the drive device to the at least one stripping member, the actuating lever being located between the pivot of the at least one disc cam and the connecting element, the at least one actuating lever being articulated on the cam disc and extending in a direction of the articulated lever, the articulated lever being movable into a region between the at least one cam disc and the actuating lever, the actuating lever having an edge facing away from the articulated lever and the pull-rod having an attachment, the edge of the actuating lever being engageable with the attachment on the pull-rod during movement of the actuating lever.

9. The stripping pliers according to claim 7, further comprising an articulated lever coupled to one of the handles, at least the handle to which the articulated lever is coupled being pivotable, the articulated lever driving the at least one cam disc of the drive device upon pivoting of the handle.

10. The stripping pliers according to claim 7, wherein two stripping members are provided as the at least one stripping member, the stripping members being on each side on the mouth.

11. Stripping pliers comprising:

a pliers housing;

two clamping jaws pivotable relative to each other, the clamping jaws being connected to the pliers housing, a mouth of the pliers being formed between the two clamping jaws;

at least one stripping member being positioned in the mouth, the at least one stripping member being displaceable in a longitudinal direction of the mouth;

two handles pivotable relative to each other, the handles being connected to the pliers housing, a first one of the handles and a first one of the clamping jaws being rigidly connected to the pliers housing, the first clamping law being on a side of the housing opposite to a side having the first handle, a second one of the handles and a second one of the clamping jaws being pivotably mounted on the pliers housing; and a drive device in the pliers housing, the drive device being operatively connected to the at least one stripping member and including at least one cam disc, the drive device being driven by pivoting of the handles, driving of the drive device pivots the clamping jaws relative to each other and longitudinally displaces the stripping member, the at least one cam disc controlling pivoting of the clamping jaws and longitudinal displacement of the stripping member during driving of the drive device, wherein the at least one disc cam is formed on a section of the second clamping jaw, the section of the second clamping jaw projecting beyond a pivot axis of the second clamping jaw towards the rear end of the pliers, the at least one cam disc being driven by an articulated lever coupled to the second handle, a free end of the articulated lever being engageable with a guide surface of the at least one cam disc.

12. The stripping pliers according to claim 11, further comprising a pull-rod and at least one actuating lever articulated on the cam disc, the pull-rod operatively connecting the drive device to the at least one stripping member, the at least one actuating lever extending towards the second handle, the articulated lever is movable into a region between the at least one cam disc and the actuating lever, the actuating lever having an edge facing away from the articulated lever and the pull-rod having an attachment, the edge of the actuating lever being engageable with the attachment on the pull-rod during movement of the actuating lever.

13. The stripping pliers according to claim 11, further comprising an articulated lever coupled to one of the handles, at least the handle to which the articulated lever is coupled being pivotable, the articulated lever driving the at least one cam disc of the drive device upon pivoting of the handle.

14. The stripping pliers according to claim 11, wherein two stripping members are provided as the at least one stripping member, the stripping members being on each side on the mouth.

15. Stripping pliers comprising:

a pliers housing;

two clamping jaws pivotable relative to each other, the clamping jaws being connected to the pliers housing, a mouth of the pliers being formed between the two clamping jaws;

at least one stripping member being positioned in the mouth, the at least one stripping member being displaceable in a longitudinal direction of the mouth;

two handles pivotable relative to each other, the handles being connected to the pliers housing; and a drive device in the pliers housing, the drive device being operatively connected to the at least one stripping member and including at least one cam disc, the drive device being driven by pivoting of the handles, driving of the drive device pivots the clamping jaws relative to each other and longitudinally displaces the stripping member, the at least one cam disc controlling pivoting of the clamping jaws and longitudinal displacement of the stripping member during driving of the drive device, wherein at least one of the clamping jaws is pivotably mounted on the pliers housing, the at least one clamping jaw having a bearing pin for removably mounting the at least one clamping jaw in a bearing device, the bearing device having two bearing plates and each bearing plate having two limbs, the bearing pin being detachably mounted between the two limbs of each of the bearing plates.

16. The stripping pliers according to claim 15, wherein the bearing plates are insertable between side walls of the pliers housing, free ends of the limbs being pointed in a direction of the mouth of the pliers when the bearing plates are between the side walls of the pliers housing.

17. The stripping pliers according to claim 15, wherein the bearing plates have marginal cutouts and the side walls of the pliers housing have attachments which engage in the marginal cutouts with a snug fit.

18. The stripping pliers according to claim 15, further comprising an articulated lever coupled to one of the handles, at least the handle to which the articulated lever is coupled being pivotable, the articulated lever driving the at least one cam disc of the drive device upon pivoting of the handle.

19. The stripping pliers according to claim 15, further comprising a pull-rod for operatively connecting the drive device to the at least one stripping member, the pull-rod having a stop mounted thereon, the at least one cam disc having a surface engageable with the stop mounted on the pull-rod whereby the at least one cam disc controls movement of the pull-rod and longitudinal displacement of the at least one stripping member.

20. The stripping pliers according to claim 15, wherein two stripping members are provided as the at least one stripping member, the stripping members being on each side on the mouth.

* * * * *